US011146949B2

(12) United States Patent
Ramsay, III et al.

(10) Patent No.: US 11,146,949 B2
(45) Date of Patent: Oct. 12, 2021

(54) SYSTEM AND METHOD FOR PROVIDING A SEAMLESS AND SECURE ACCESS TO MANAGEMENT AND MONITORING SYSTEMS

(71) Applicant: DELL PRODUCTS, LP, Round Rock, TX (US)

(72) Inventors: George Francis Ramsay, III, Elgin, TX (US); Saurabh Kishore, Round Rock, TX (US); Arulnambi Raju, Round Rock, TX (US); Dung K. Le, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 53 days.

(21) Appl. No.: 16/793,439

(22) Filed: Feb. 18, 2020

(65) Prior Publication Data

US 2021/0258774 A1 Aug. 19, 2021

(51) Int. Cl.
*H04L 29/06* (2006.01)
*H04W 12/033* (2021.01)
(Continued)

(52) U.S. Cl.
CPC ....... *H04W 12/033* (2021.01); *H04W 12/069* (2021.01); *H04W 12/37* (2021.01); *H04W 12/69* (2021.01)

(58) Field of Classification Search
CPC ... H04W 12/033; H04W 12/37; H04W 12/69; H04W 12/069; H04W 84/12; H04W 4/80;
(Continued)

(56) References Cited

U.S. PATENT DOCUMENTS

10,229,082 B2 3/2019 Ahmed et al.
10,383,157 B2 8/2019 Raju et al.
(Continued)

*Primary Examiner* — Yogesh Paliwal
(74) *Attorney, Agent, or Firm* — Larson Newman, LLP (57) ABSTRACT

An information handling system includes a wireless management controller having a first wireless network interface used to establish a secure short-range wireless network connection between a management controller and a mobile device. A second wireless network interface establishes a peer-to-peer wireless network connection between the management controller and the mobile device. The management controller stores a secure shell public key received from the mobile device through the secure short-range wireless network connection. The management controller randomly identifies a port number for the peer-to-peer wireless network connection, and disables network traffic through other ports associated with the peer-to-peer wireless network connection. The management controller also transmits a media access control address, the port number, and a host fingerprint to the mobile device through the secure short-range wireless network connection, and receives an access request from the mobile device on the port number of the peer-to-peer wireless network connection after the mobile device authenticated the media access control address and the host fingerprint Determining whether the mobile device is authentic through a secure shell negotiation based on the received secure shell public key. In response to the determination that the mobile device is authentic identifying a group owner of the peer-to-peer wireless network connection based on a negotiation with the mobile device. After the establishment of the peer-to-peer wireless network connection, the management controller may communicate packets with the mobile device on the port number of the peer-to-peer wireless network connection, where outbound packets are encrypted and inbound packets are decrypted.

20 Claims, 5 Drawing Sheets

(51) Int. Cl.
  *H04W 12/37* (2021.01)
  *H04W 12/069* (2021.01)
  *H04W 12/69* (2021.01)

(58) Field of Classification Search
  CPC ..... H04W 76/14; H04W 12/06; H04W 48/16;
            H04W 76/10; H04W 12/50; H04W 76/15;
                                          H04W 12/08
  See application file for complete search history.

(56) References Cited

U.S. PATENT DOCUMENTS

| | | | |
|---|---|---|---|
| 10,681,591 B2* | 6/2020 | Lee ....................... | H04W 48/10 |
| 2013/0178160 A1* | 7/2013 | Wang ................... | H04W 48/10 |
| | | | 455/41.2 |
| 2016/0234202 A1 | 8/2016 | Ahmed et al. | |
| 2017/0180206 A1 | 6/2017 | Ahmed et al. | |
| 2020/0257480 A1* | 8/2020 | Asakura ................ | G06F 3/1222 |

* cited by examiner

SYSTEM AND METHOD FOR PROVIDING A SEAMLESS AND SECURE ACCESS TO MANAGEMENT AND MONITORING SYSTEMS

FIELD OF THE DISCLOSURE

The present disclosure generally relates to information handling systems, and more particularly relates to providing a seamless and secure access to management and monitoring systems.

BACKGROUND

As the value and use of information continue to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a wireless management controller having a first wireless network interface used to establish a secure short-range wireless network connection between a management controller and a mobile device. A second wireless network interface establishes a peer-to-peer wireless network connection between the management controller and the mobile device. The management controller stores a secure shell public key received from the mobile device through the secure short-range wireless network connection. The management controller randomly identifies a port number for the peer-to-peer wireless network connection, and disables network traffic through other ports associated with the peer-to-peer wireless network connection. The management controller also transmits a media access control address, the port number, and a host fingerprint to the mobile device through the secure short-range wireless network connection, and receives an access request from the mobile device on the port number of the peer-to-peer wireless network connection after the mobile device authenticated the media access control address and the host fingerprint Determining whether the mobile device is authentic through a secure shell negotiation based on the received secure shell public key. In response to the determination that the mobile device is authentic identifying a group owner of the peer-to-peer wireless network connection based on a negotiation with the mobile device. After the establishment of the peer-to-peer wireless network connection, the management controller may communicate packets with the mobile device on the port number of the peer-to-peer wireless network connection, where outbound packets are encrypted and inbound packets are decrypted.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
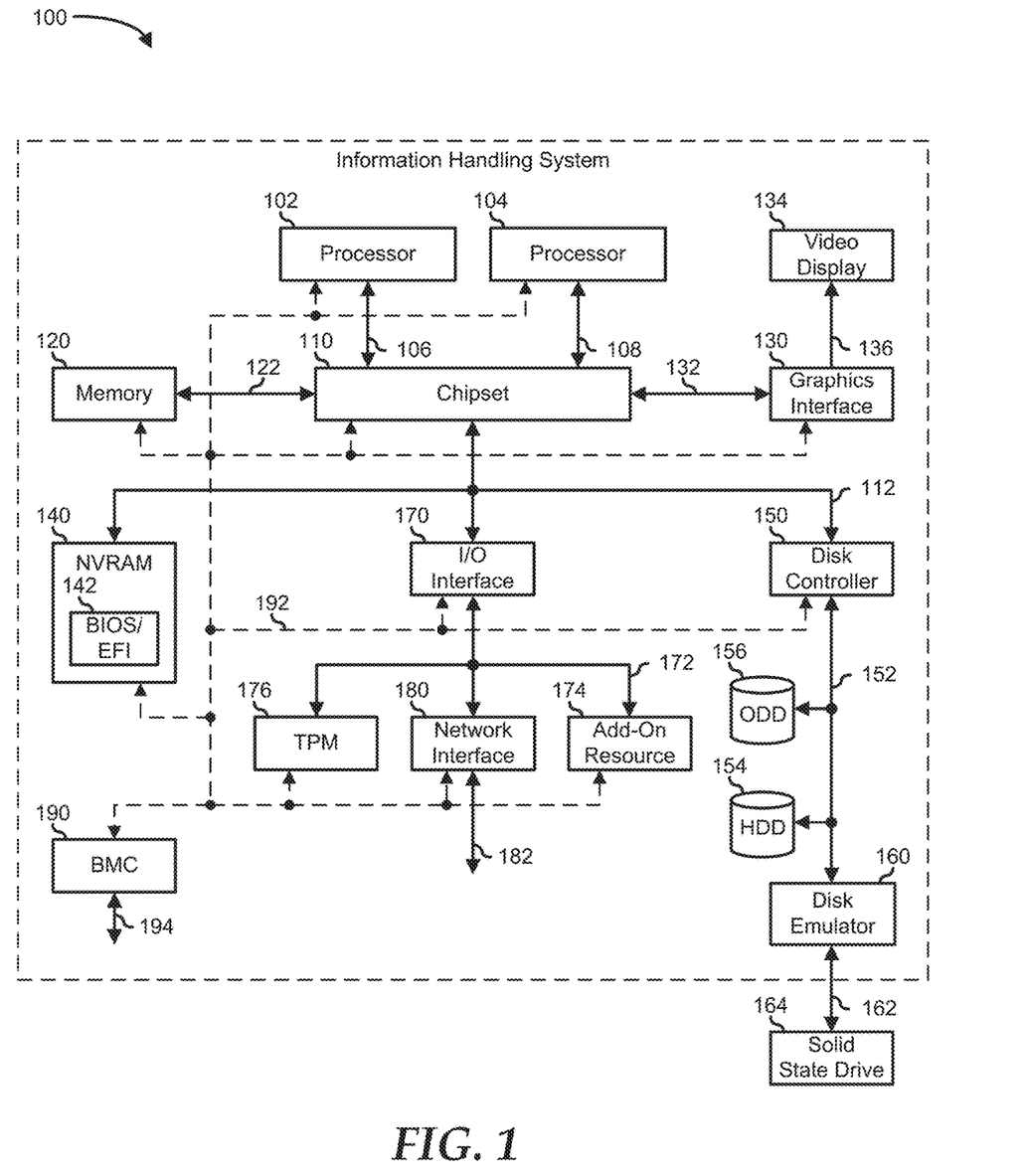
FIG. 1 is a block diagram illustrating an information handling system according, to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wireless-Fidelity (Wi-Fi) channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated into another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The inventors of this disclosure have determined that at-the-box management of information handling systems such as in a data center typically utilizes wireless technology using the Wi-Fi channel to connect a mobile device with a management and monitoring system of an information handling system. However, there are certain issues when using the Wi-Fi channel, such as it forces a user to disconnect from the user's existing Wi-Fi connection in the mobile device. In addition, a persistent Wi-Fi connection with the management and monitoring system is unreliable due to the mobile device's operating system attempts to gain internet access. Also, an occasional delay with the Wi-Fi connection is usually encountered, which generally requires the user to intervene. Finally, typically the user has to pull up a web browser and type in a static internet protocol address to access the management and monitoring system's user interface. This may be difficult or impossible for some users.

In order to overcome the above issues, the present disclosure utilizes a peer-to-peer wireless network connection such as Wi-Fi Direct™ instead of the Wi-Fi channel. The Wi-Fi Direct is a Wi-Fi standard that enables devices to communicate directly with each other without requiring a central access point. Compared to other short-range wireless communications such as Bluetooth, Wi-Fi Direct offers a faster connection across greater distances. Wi-Fi Direct typically negotiates a connection with a Wi-Fi protected setup system which allows access points to be set up simply by entering a personal identification number (PIN) or other identification into a connection screen, or in some cases, by pressing a button which may be cumbersome for the user managing several information handling systems at a time. In addition, Wi-Fi Direct has vulnerabilities. For example, Wi-Fi Direct allows one of the connected devices to act as a group owner, which can then allows another device to connect to it. This other device, which may be an unauthorized device, can connect to the group owner using a factory preset username/password. The unauthorized device can also connect using a PIN which is a numerical eight-digit code that may be subjected to a brute force attack. Once connected, the unauthorized device can access the management and monitoring system's user interface and it can begin capturing network traffic. This is otherwise known as a man-in-the-middle attack. These vulnerabilities among others are also addressed in the present disclosure.

Figure 2:
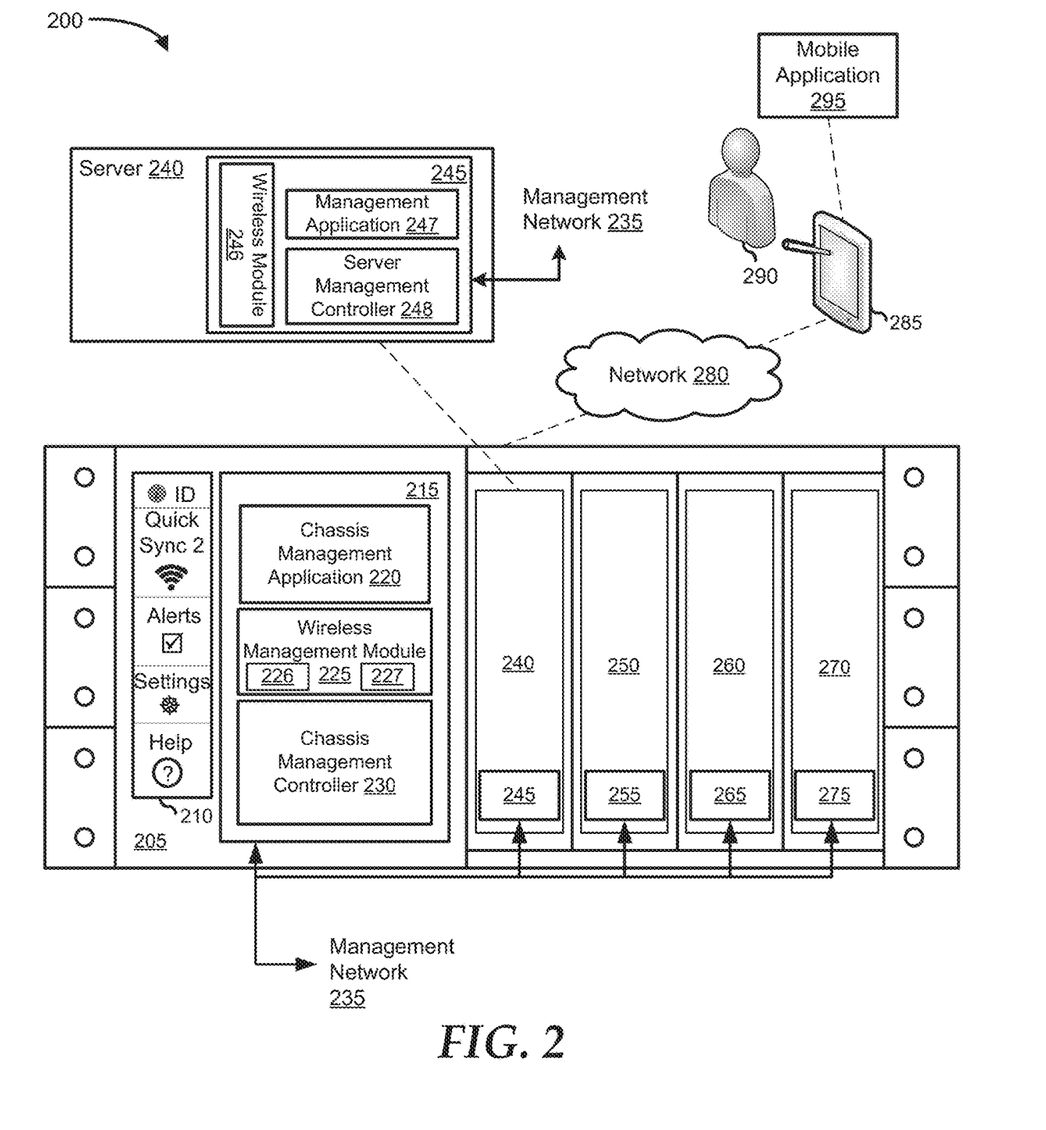
FIG. 2 is a block diagram illustrating an example of a system for providing a seamless and secure access to an information handling system's management and monitoring system.

FIG. 2 illustrates a system 200 for seamless and secure access to the monitoring and management system of an information handling system via a peer-to-peer wireless network connection. System 200 includes a blade chassis 205, a blade server 240, and a mobile device 285. Mobile device 285 is connected to blade chassis 205 via a network 280 allowing a user 290 to manage and/or monitor blade chassis 205 and its components such as blade server 240. Network 280 may be connected to blade chassis 205 through a management network 235. In one embodiment, system 200 may be in a data center, wherein user 290 is an information technology administrator. In another embodiment blade server 240 may be a stand-alone monolithic server as well as a blade server for the purpose of this patent application.

Blade chassis 205 is configured to include a number of modular processing resources, or blades, that are provided in a common frame and provides shared power, cooling, networking I/O, and system management. As such, blade chassis 205 includes blade server 240 and a blade server 250, each of which is similar to information handling system 100. Blade chassis 205 also includes a blade storage 260 and a blade storage 270. Each of the blade servers 240 and 250 may be mapped to one or more of blade storages 260 and 270. Further, blade chassis 205 includes a front panel 210 and a chassis management system 215 that includes a chassis management controller 230, a chassis management application 220, and a chassis wireless management module 225. Blade chassis 205 allows user 290 to connect to chassis management system 215 and/or server management system 245 via management network 235 through the communication channel.

Blade server 240 includes a server management system 245 which is similar to chassis management system 215. Server management system 245 includes a server management controller 248, a server management application 247, and a server wireless management module 246. Blade server 250 includes a server management system 255 which is similar to server management system 245. Likewise, blade storage 260 includes a storage management system 265 and blade storage 270 includes a storage management system 275. Storage management system 265 and storage management system 275 may also be configured similar to server management system 245. Blade chassis 205 and its components such as blade server 240 may include other applications, network interface, or available protocols, without limitation.

Chassis management system 215, server management systems 245 and 255, and storage management systems 265 and 275 are connected to management network 235 to provide for out-of-band monitoring, management, and control of blade chassis 205, blade servers 240 and 250, and blade storages 260 and 270 respectively. For example, chassis management system 215 and server management systems 245 and 255 can provide system monitoring functions, such as temperature monitoring, power supply monitoring, physical intrusion monitoring, hot-swap and hot-plug monitoring, other monitoring functions that can be performed outside of their hosted environments or other system monitoring functions as needed or desired. The aforementioned monitoring and management functions can also be performed using mobile device 285 wirelessly connected to chassis management system 215, server management systems 245 and 255, and storage management systems 265 and 275 via network 280 and/or management network 235.

Chassis management system 215 and server management systems 245 and 255 may host a dynamic host configuration protocol (DHCP) service that provides a unique internet protocol address to connected mobile device 285. In addition, chassis management system 215 and server management system 245 can establish the connection with mobile device 285 based upon a media access control (MAC) address, a fingerprint, a static internet protocol address of the mobile device or a combination thereof as needed or desired. In a particular embodiment, chassis management system 215 and server management system 245 operate to provide a network configuration that may provide and/or allow mobile device 285 to access chassis management system 215 and/or server management system 245. As such, server management system 245 can provide service set identifiers (SSIDs), security keys such as secure shell (SSH) keys, gateway addresses, serial numbers, and other configuration information.

Chassis management controller 230 may represent embedded controllers or management modules that are associated with blade chassis 205. Chassis management controller 230 operates separately from blade chassis 205 and is similar to BMC 190 of FIG. 1. The skilled artisan will recognize that chassis management controller 230 can include other circuit elements, devices, or sub-systems, such as a logic device such as a Programmable Array Logic (PAL) device, a Complex Programmable Logic Device (CPLD), a Field-Programmable Gate Array (FPGA) device, or the like, multiplexors, and other devices as needed or desired to provide the functions and features as described herein. Server management controller 248 may be configured similarly to chassis management controller 230 and perform similar functions.

Chassis management application 220 is an application installed on a physical host operating system of the managed device, such as chase blade chassis 205. Chassis management application 220 utilizes protocols and application programming interfaces similar to the protocols and application programming interfaces utilized by BMC 190 of FIG. 1, such as Dell EMC OpenManage Enterprise Module (OME-Modular) application that runs on chassis management system 215. The OME-Modular application or the like may be a user interface such as a web interface, a RACADM command-line interface, Redfish, and WSMan, etc. to provide remote management capabilities to blade chassis 205 via access to chassis management controller 230.

Server management application 247 is similar to chassis management application 220 and runs on server management system 245 which is used to access server management controller 248. Likewise, a server management application is installed on each of the blade servers in blade chassis 205 to access each one of server management systems. Similarly, a storage management application may be installed on each of the blade storages in blade chassis 205 to access each one of storage management systems.

Chassis wireless management module 225 may be configured to provide wireless connectivity between users with a wireless-enabled mobile device 285 and management network 235 through the chassis management controller 230. As such, chassis wireless management module 225 includes a wireless controller. Chassis wireless management module 225 can include Wi-Fi wireless interfaces in accordance with one or more IEEE 802.11 specifications for high-speed data communication between mobile device 285 and chassis wireless management module 225 at speeds of up to 30 megabits per second or more. Chassis wireless management modules 225 can also include an interface for personal area networks such as Bluetooth wireless interfaces in accordance with one or more Bluetooth specifications, including BLE, also known as Bluetooth Smart (BTS), for lower-speed communications at speeds of up to 150 kilobits per second or more. In addition, chassis wireless management module 225 can include an interface for a peer-to-peer wireless network such as a Wi-Fi Direct interface. A communication channel may be established over a variety of wireless frequency bands, including 2.4 GHz, 5 GHz, and 60 GHz, using standards such as the Institute of Electrical and Electronics Engineers (IEEE) 802.11a, 802.11b, 802.11g, 802.11n, and 802.11 ac. In one embodiment, chassis wireless management module 225 includes a personal area network interface and a peer-to-peer network interface. For example, chassis wireless management module 225 includes a Bluetooth interface 226 and a Wi-Fi Direct interface 227.

Chassis wireless management module 225 may include various security features to ensure that the connection between mobile device 285 and management network 235 is secure and that user 290 of mobile device 285 is authorized to access the resources of management network 235. In particular, chassis wireless management module 225 operate to provide various Wi-Fi Direct, Bluetooth, and Wi-Fi user and device authentication schemes, such as schemes that are in accordance with one or more IEEE 802.11 specifications, SSID hiding, MAC Identification (MAC ID) filtering to allow only pre-approved devices or to disallow predetermined blacklisted devices, static internet protocol addressing, Wired Equivalent Privacy (WEP) encryption, Wi-Fi Protected Access (WPA) or WPA2 encryption, Temporary Key Integrity Protocol (TKIP) key mixing, Extensible Authentication Protocol (EAP) authentication services, EAP variants such as Lightweight-EAP (LEAP), Protected-EAP (PEAP), and other standard or vendor-specific user and device authentication schemes, as needed or desired. Further, chassis wireless management module 225 may operate to provide various Wi-Fi Direct and Bluetooth device and service authentication schemes, such as a Security Mode 2 service level-enforced security mode that may be initiated after link establishment but before logical channel establishment, a Security Mode 3 link level-enforced security mode that may be initiated before a physical link is fully established, a Security Mode 4 service level-enforced security mode that may be initiated after link establishment but before logical channel establishment and that uses a Secure Simple Pairing (SSP) protocol, or other device or service authentication schemes, as needed or desired.

Chassis wireless management module 225 may also be configured to deactivate one or more of the network connections in response to an event. The event may include an error event, a timeout event, and a warning event, etc. For example, a warning event may be triggered if the network connection has gone dormant or otherwise ceased to interact with chassis management controller 230, such as when mobile device 285 has moved out of range of chassis wireless management module 225. In another example, the timeout event may be triggered if the network connection is not established within a specified threshold. Chassis management controller 230 may set a maximum time for the mobile device to connect to the network, also referred to as a pre-determined timeout period. If the mobile device fails to connect within the maximum time, then the timeout event may occur and chassis management controller 230 may direct chassis wireless management module 225 to disable and/or deactivate the network connection. For example, chassis wireless management module 225 may disable the peer-to-peer wireless network connection and/or the personal area network connection. In one embodiment, the information technology administrator may set the timeout event to occur after five seconds. In another example, chassis wireless management module 225 may disable the radio communication if network connection is lost. In yet another example, mobile device 285 may drop the network connection if the host fingerprint and/or media access control (MAC) address received from the information handling system does not match the expected host fingerprint and the expected MAC address. Verifying the host fingerprint and/or the MAC address by performing the match ensures that the mobile device is connected to the right information handling system and/or management controller which helps avert man-in-the-middle attacks. Server wireless management module 246 may be configured similarly to chassis wireless management module 225 and perform similar functions.

Mobile device 285 represents a wired and/or wireless communication-enabled device, such as a tablet device, a laptop computer, a cellular telephone, and the like, that is configured to interact with chassis management system 215 and its components such as server management system 245 via a wired connection or a wireless connection. Mobile device 285 may include networking or a communication interface that supports IEEE 802.11 protocols (including a, b, g, or n), single or dual-band Wi-Fi, Wi-Fi Direct, Bluetooth communication, and near field communication (NFC). Mobile device 285 can include a mobile operating system (OS), such as an Android OS, an iOS, a Windows® mobile OS, or another mobile OS that is configured to operate with the hardware of the mobile device. Mobile device 285 includes a mobile application 295 such as Dell EMC OpenManage Mobile (OMM) for monitoring and managing chassis management system 215 and its components and other data center devices. Mobile application 295 enables information technology administrators to perform a subset of server configuration, monitoring, troubleshooting, and remediation tasks.

Network 280 is configured to communicatively couple blade chassis 205 and/or its components with mobile device 285 via management network 235. A communication channel through network 280 can be established between mobile device 285 and management network 235 to access the management functions and features of blade chassis 205 and its components. For example, mobile device 285 can access chassis management system 215, server management system 245, server management system 255, storage management system 265, and storage management system 275. Network 280 may include a communication infrastructure, which provides wireless and/or wired or physical connections, and a management layer, which organizes the connections and information handling systems coupled to network 280. Network 280 may be implemented as, or may be a part of, a storage area network (SAN), a personal area network, a LAN, a metropolitan area network (MAN), a peer-to-peer network, a wide area network (WAN), a wireless local area network (WLAN), a virtual private network (VPN), an intranet, the Internet, or any other appropriate architecture or system that facilitates the communication of packets, signals, data and/or messages (generally referred to as data). Network 280 may transmit data via wireless transmission and/or wire-line transmissions using any storage and/or communication protocol, including without limitation, Fibre Channel, Frame Relay, Asynchronous Transfer Mode (ATM), internet protocol, other packet-based protocol, SCSI, Internet SCSI, Serial Attached SCSI (SAS), or any other transport that operates with the SCSI protocol, ATA, SATA, advanced technology attachment interface (ATAPI), serial storage architecture (SSA), IDE, and/or any combination thereof.

In the present disclosure, a secure personal area network such as the BLE channel may first be established between mobile device 285 and blade chassis 205 and/or its components. In a particular embodiment, chassis management system 215 operates to provide a pre-connection authentication of devices that seek to make wireless connections with chassis management controller 230. Similarly, server management system 245 operates to provide a pre-connection authentication of devices that seek to make wireless connections with server management controller 248. For example, in a typical use of a Bluetooth interface, when a device wants to establish a point-to-point wireless communication link with another device, the first device sends a beacon, the second device establishes the point-to-point wireless communication link with the first device, and both devices receive an input confirming that the point-to-point wireless communication link should be maintained, a process typically called "pairing." Chassis management system 215 can be configured to send a beacon with identifiable information so that a mobile device can make a determination as to whether or not to establish the point-to-point wireless communication link based upon the contents of the information in the beacon.

In one embodiment, a peer-to-peer communication channel such as the Wi-Fi Direct channel may be established in addition to an existing communication channel. Establishment of the peer-to-peer network channel may be triggered by an event associated with management and monitoring of blade chassis 205 and/or its components wherein it is desirable to have a communication channel that can handle more information at higher speeds. For example, establishment of the Wi-Fi Direct communication channel may be triggered by download of a file. The peer-to-peer communication channel allows for device-to-device wireless communication, linking devices together without a nearby centralized network. One device acts as an access point, and the other device connects to it using a security protocol such as Wi-Fi protected setup and WPA security protocols. This makes Wi-Fi Direct a great choice when a peer-to-peer connection needs to transmit data-rich content, like a high-resolution image or a video. For a seamless connection and added security, in one embodiment, network 280 may be a PIN-less Wi-Fi Direct network.

In the present disclosure, a secure (authenticated and encrypted) personal area network such as a secure BLE network may be first established between mobile device 285 and blade chassis 205, in particular mobile application 295 and chassis management controller 230 over Bluetooth interface 226. The secure BLE channel may then be leveraged during establishment of a second network connection, which may be the peer-to-peer network connection, such as the Wi-Fi Direct. That is, the BLE channel may be used for communication between mobile device 285 and chassis management controller 285 to establish the Wi-Fi Direct network connection. In addition, during the establishment of the Wi-Fi Direct network connection, mobile application 295 and chassis management controller 230 may establish trust between them based on a mutual authentication procedure. Authentication may be performed by exchanging security credentials such as keys, exchanging secrets, two-factor authentication or some other method. For example, mobile application 295 may generate an SSH public key and sends it to chassis management controller 230, which is the management controller of the remote host to be managed and/or monitored, over the secure BLE channel. The SSH public key will be generated for each new session of the Wi-Fi Direct network connection.

Upon receipt of the SSH public key, chassis management controller 230 may modify or direct chassis wireless management module 225 to modify firewall rules to drop all network traffic over ports associated with the Wi-Fi Direct interface 227 except for a randomly identified private port number. For example, chassis management controller 230 may update iptable rules. This is performed to minimize the attack surface of an unauthorized device. The randomly identified port number is used as a private port between chassis management controller 230 and mobile device 285.

Chassis management controller 230 may disable password authentication to prevent an unauthorized user to connect to the Wi-Fi Direct network using a default username/password. On the other hand, chassis management controller 230 may enable a key or certificate-based authentication over the Wi-Fi Direct network. Chassis management controller 230 may then add the received SSH public key to a trusted key store. Chassis management controller 230 may then send mobile application 295 connection information and security credentials over the secure BLE channel. For example, chassis management controller 230 may send the private port number that was kept open, its Rivest-Shamir-Adleman (RSA) host fingerprint, its MAC address, etc. Upon receipt of information from chassis management controller 230, mobile application 295 may verify the information or a portion thereof such as the host fingerprint, the MAC address, etc. that it is connected to the correct information handling system or host, which is blade chassis 205.

After verifying that it is connected to blade chassis 205 over the secure BLE channel, mobile application 295 may send a request to chassis management controller 230 to enable a Wi-Fi Direct channel. The request may be sent over the secure BLE channel. Upon receipt of the request, chassis management controller 230 enables the Wi-Fi Direct channel and sends a Wi-Fi Direct advertisement to mobile application 295 and waits for mobile device 285 to confirm a successful Wi-Fi Direct connection notification over the secure BLE channel. If mobile device 285 fails to connect and authenticate within a configurable period of time, for example in five seconds, then chassis management controller 230 will disable the Wi-Fi Direct radio. In addition, chassis management controller 230 may drop the Wi-Fi Direct connection, and/or the BLE connection.

After the verification, mobile application 295 may then attempt to establish an SSH session to connect to chassis management controller 230 on the private port of the Wi-Fi Direct channel. In particular, mobile application 295 may create a secure SSH tunnel with port forwarding on the private port of the Wi-Fi Direct channel. As used herein, SSH tunneling is a method of transporting data over an encrypted SSH connection. Communication outside of the private port such as to the internet via a port 80 for example, is performed via redirection or port forwarding. Chassis management controller 230 responds to the request and may include the host fingerprint with the response. Mobile application 295 validates such as compares the host fingerprint received via the host fingerprint received over the BLE channel. Fingerprint validation may be performed to avoid connecting to a malicious peer-to-peer device. If the host fingerprints don't match, then mobile application 295 will drop the Wi-Fi Direct connection. In addition, mobile device 285 may also inform chassis management controller 230 over the BLE channel to shut down the Wi-Fi Direct radio.

Wi-Fi Direct outbound traffic is now encrypted as it is going through the secure tunnel. Accordingly, inbound traffic is decrypted. The present disclosure uses secure tunneling to prevent a man-in-the-middle attack. Once the Wi-Fi Direct connection is successful and secured, mobile application 295 and chassis management controller 230 may negotiate who will be a group owner. The group owner is responsible for monitoring all future Wi-Fi Direct connection "join" requests to the Wi-Fi Direct group. This ensures that the Wi-Fi Direct connection is secured and prevents the future "join" requests. This solution allows for seamless Wi-Fi Direct connection with minimal user interaction if any. The example outlined above used chassis management controller 230 to illustrate various stages in providing a seamless and secured PIN-less Wi-Fi Direct connection. This is for illustration purposes only; other management controllers such as server management controller 248 may be configured to perform functions similar to chassis management controller 230.

Figure 3:
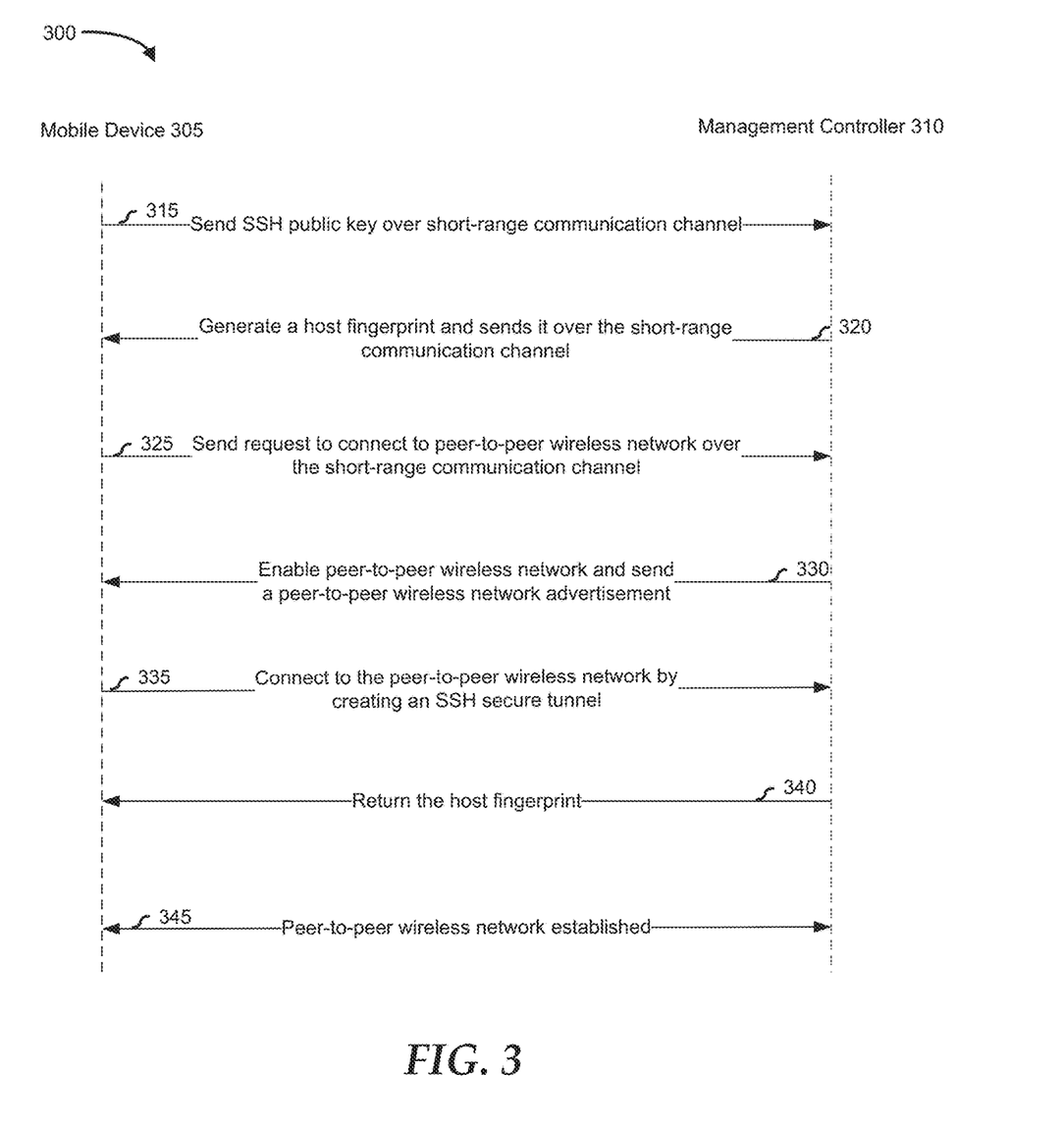
FIG. 3 is a diagram illustrating an example of a sequence for providing seamless and secure access to the information handling system's management and monitoring system.

FIG. 3 is a diagram of sequence 300 illustrating transactions between two information handling systems also referred to as peer-to-peer networking devices according to one embodiment of the present disclosure. The peer-to-peer networking devices may be located in a data center that is configured to provide a wireless management network. In one embodiment, one of the peer-to-peer networking devices is a mobile information handling system while the other is a remote information handling system. As used herein, the remote information handling system may be in a vicinity of several feet from the mobile information handling system. Mobile information handling also referred to as mobile device 305 is similar to mobile device 285 of FIG. 2 and may be used to access a management controller 310 of the remote information handling system. In particular, a mobile application such as (OMNI) may be installed in mobile device 305 and performs one or more steps of sequence 300 along with OMSA installed in the remote information handling system and/or a firmware/software installed in management controller 310. The mobile application is used for monitoring and managing information handling systems, such as blade chassis, blade servers, blade storages, and other data center devices from a mobile device. Remote information handling system may be similar to blade chassis 205, blade servers 240 and 250, and blade storages 260 and 270 of FIG. 2. Management controller 310 may be similar to BMC 190 of FIG. 1, chassis management controller 230 of FIG. 2, and server management controller 248 of FIG. 2. Management controller 310 may include a wireless communication interface that permits a user of mobile device 305 to connect to the management controller 310 to gain management access to its functions and features. The wireless communication interface includes a wireless data communication interface for short-range wireless communication. For example, wireless communication interface may include a wireless data communication interface for establishing a personal area network, such as a Near-Field Communication (NFC) interface, a Bluetooth interface, a Bluetooth-Low Energy (Bluetooth-LE) interface, ZigBee, or the like. Wireless communication interface may also include a wireless data communication interface for establishing a WLAN, such as a Wi-Fi, Wi-Fi Direct interface, or 802.11 interfaces or the like, or another wireless interface.

Prior to step 315, mobile device 305 is connected to management controller 310 over a secured that is authenticated and encrypted low-powered short-distance wireless communication channel such as a BLE channel. Leveraging the secure short-distance wireless communication channel, an SSH peer-to-peer wireless network connection is established between mobile device 305 and management controller 310 as illustrated in sequence 300. The SSH protocol provides a channel for communication that features end-to-end encryption, authentication, and data integrity. Under the transportation layer of the SSH protocol, one party verifies itself to the other based upon its possession of a private/public key pair. The private key may be used to decrypt information encrypted with the public key. The holder of the key pair may disseminate the public key. Parties wishing to communicate with the holder of the key pair may encrypt messages with the public key. The holder, the only entity possessing the private key, may be the only party capable of decrypting the messages. Thus, the messages to the private key holder may be secure. In turn, the holder may verify its identity by constructing a signature of a message by using the private key. When an entity possessing the public key verifies that the signature is valid, the entity knows that the sender of the message must possess the private key.

At step 315, mobile device 305 generates an SSH private/public key pair and sends the SSH public key to management controller 310 via the encrypted short-range communication channel. The request may include other information such as security credentials, internet protocol address and/or MAC address of mobile device 305, etc. Mobile device 305 may generate the SSH private/public key pair and sends the SSH public key for each session of the peer-to-peer wireless network connection.

At step 320, management controller 310 generates a host fingerprint and sends it to mobile device 305 via the encrypted short-range communication channel. In addition, the management controller may also send a randomly identified port number and the MAC address of a wireless controller of the remote information handling system. The wireless controller may also be referred herein as a Wi-Fi Direct interface.

At step 325, a user or an application at the mobile device chooses to connect to the peer-to-peer wireless network connection. Mobile device 305 may send management controller 310 a request to connect to the peer-to-peer wireless network connection via the short-range wireless network connection. For example, the OMNI sends a request to connect to Wi-Fi Direct through the secure BLE channel.

At step 330, management controller 310 directs the wireless controller to enable the peer-to-peer wireless network connection such as the Wi-Fi Direct. After receiving the direction from management controller 310, the wireless controller may send a peer-to-peer network broadcast. For example, the wireless controller sends a Wi-Fi Direct advertisement to mobile device 305. At this point, management controller 310 may set a timer for mobile device 305 to make the peer-to-peer connection. For example, management controller 310 may set the timer to 5 seconds, wherein a connection request is to be received from mobile device 305 otherwise management controller may drop the peer-to-peer wireless network connection and disable the peer-to-peer network connect at the wireless controller.

At transaction 335, mobile device 305 tries to connect to management controller 310 by creating an SSH secure tunnel on the private port. The SSH secure tunnel may feature port forwarding that redirects a network packet from one address and/or port number to another.

At step 340, management controller 310 transmits the host fingerprint to mobile device 305 via the SSH secure tunnel. Management controller 310 may also transmit other information such as MAC address, internet protocol address, security credentials, etc. with the host fingerprint. Upon receipt of the host fingerprint, mobile device 305 may compare this host fingerprint with the host fingerprint received earlier at step 320. Mobile device 305 may also compare the MAC address received at steps 340 and 320. The comparison is performed to verify that the SSH secure tunnel is connected to the right information handling system and/or management controller, which is management controller 310. Mobile device 305 may drop the peer-to-peer wireless network connection if the host fingerprint and MAC address do not match. Management controller 310 may detect that the peer-to-peer network connect has been dropped or lost, and management controller 310 may direct the wireless controller to shut down the Wi-Fi Direct interface radio. Management controller 310 may also disable the Wi-Fi Direct interface if the peer-to-peer wireless network connection is not made within the time set at step 330.

At step 345, mobile device 305 sets the application to use the localhost and the private port when transmitting data using the peer-to-peer wireless network connection. At this point, the peer-to-peer wireless network connection between mobile device 305 and management controller 310 is established and mobile device 305 can access management controller 310. As wireless communications between mobile device 305 and management controller 310 can be performed. In particular, the user can now access a graphical user interface associated with the management application installed at management controller 310. To assure the security of information from mobile device 305 to the remote information handling system or management controller 310 in particular, outbound packets from mobile device 305 to the remote information handling system are encrypted and are decrypted by the remote information handling system upon receipt. Network traffic or a portion thereof going through the secure SSH tunnel may be forwarded to the correct port. Mobile device 305 may negotiate to be a group owner of the peer-to-peer wireless network connection. As the group owner, mobile device 305 may not allow any other connections and will drop the peer-to-peer wireless network connection and/or the short-range wireless network connection if the user tries to add another device to the peer-to-peer wireless network connection and/or another device attempts to join the peer-to-peer wireless network connection. In another embodiment, management controller 310 may negotiate to be the group owner and perform its functions.

Figure 4:
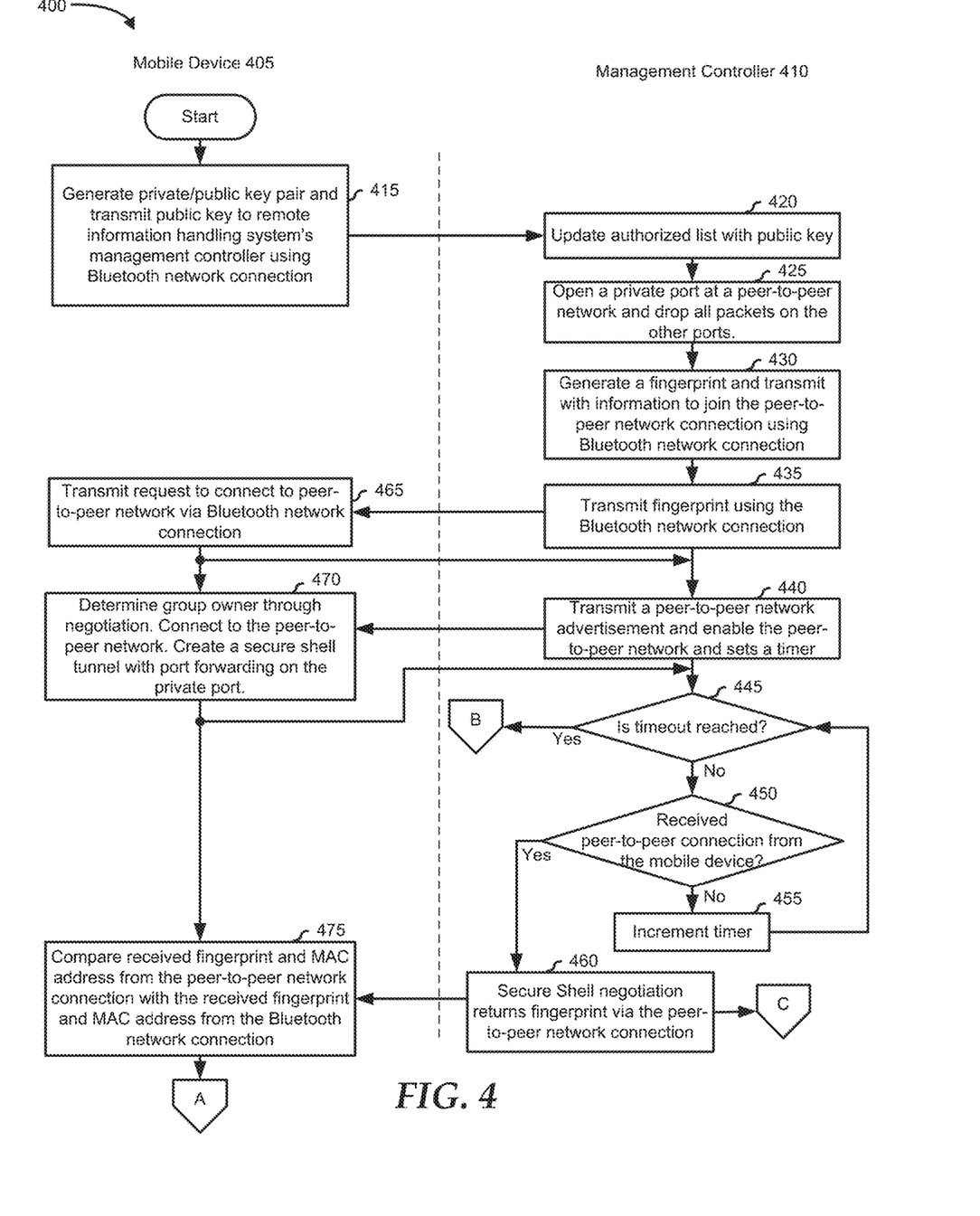
FIG. 4 and FIG. 5 are flowcharts illustrating an example of a method for providing seamless and secure access to the information handling system's management and monitoring system.
Figure 5:
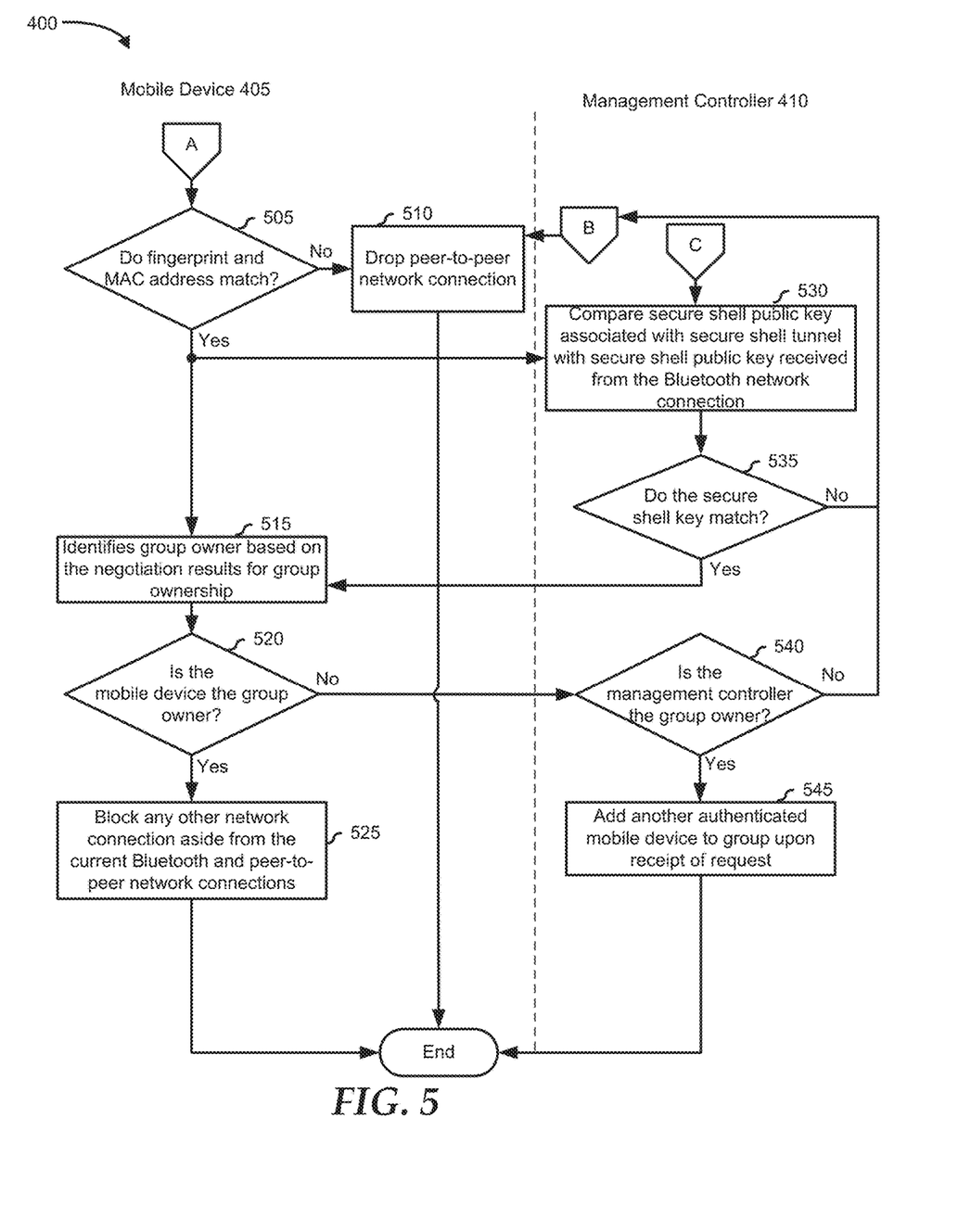

FIG. 4 and FIG. 5 illustrate a method 400 for configuring a seamless and secure peer-to-peer wireless connection. Method 400 may be performed by one or more components of FIG. 2. In particular, method 400 may be performed by mobile device 405 and one or more components of a remote information handling system such as management controller 410. Mobile device 405 and management controller 410 has been authorized and authenticated during the establishment of the Bluetooth network connection prior to method 400. Management controller 410 may set a maximum time for method 400 to be executed. For example, the management controller may require that the mobile device 405 may connect to management controller 410 within 5 seconds after the management controller 410 transmits its fingerprint. Method 400 typically starts at block 415 where the method initiates establishing a peer-to-peer network communication channel. The peer-to-peer communication channel may be established over a variety of wireless frequency bands, including 2.4 GHz, 5 GHz, and 60 GHz, using standards such as the Institute of Electrical and Electronics Engineers (IEEE) 802.11a, 802.11b, 802.11g, 802.11n, and 802.11 ac. Only one Bluetooth Direct network connection is allowed to connect to management controller 410 of the remote information handling system.

The method may initiate establishing the peer-to-peer network communication channel upon detection of an operation wherein the use of a peer-to-peer network communication channel is more desirable than using the Bluetooth network communication channel. In general, Bluetooth technology is useful when transferring information between two or more devices that are near each other when speed is not an issue and best suited to low-bandwidth applications. Thus, if mobile device 405 detects that high-speed data transmission is desirable for the current operation such as downloading data files, then mobile device 405 may initiate establishing the peer-to-peer network communication channel.

The method may initiate establishing a peer-to-peer network channel by generating an SSH private/public key pair and transmitting the SSH public key the remote information handling system via the secured BLE network connection established earlier. In particular, the mobile device may transmit the SSH public key to the management controller, service processor, baseboard management controller, or similar to the remote information handling system. The remote information handling system may be a blade server, a blade storage, a chassis management system, a mobile device, etc. The method proceeds to block 420.

At block 420, the method at management controller 410 adds the received SSH public key to a list of authorized SSH public keys. Each of the authorized SSH public key in the list may be associated with an authenticated mobile device or information handling system. Management controller 410 may maintain a local or a remote key store which may be an industry-standard encrypted database file. The management controller updates a list of SSH authorized public keys with the received SSH public key from mobile device 405. As mobile device 405 has been authenticated during the establishment of the BLE connection, management controller 410 may trust the SSH public key from mobile device 405 and adds it to the list of authorized SSH keys. In another embodiment, management controller 410 may verify and/or validate the SSH public key before adding it to the key store. Mobile device 405 generates the SSH public key for each session of the peer-to-peer network connection. Management controller 410 may enable a key-based authentication over the peer-to-peer network and disable password authentication.

The SSH public key may be used by management controller 410 to encrypt packets or data prior to sending them to mobile device 405 via the peer-to-peer network communication channel. The method at management controller 410 proceeds to block 425 where a randomly identified private port is opened while blocking other ports for security. For example, management controller 410 may generate firewall rules to drop all packets on all ports in the peer-to-peer network. In a Linux system, management controller 410 may set an iptable to drop all packets on all ports on the Wi-Fi Direct interface. In one embodiment, iptable rules are established to drop all packets on all ports associated with the peer-to-peer wireless network such as the Wi-Fi Direct network. Management controller 410 may randomly determine a private port to be opened at the peer to peer network and opens that port to network traffic. In addition, management controller 410 disables the password authentication associated with the said port. Management controller 410 may then establish iptable rules to allow network packets to the opened port. Management controller 410 may advertise the Wi-Fi Direct address so that mobile device 405 can see it. For example, the Wi-Fi Direct address shows up during a scan performed by mobile device 405. In another embodiment, management controller 410 may direct the wireless controller to perform some or all functions in block 425.

The method associated with management controller 410 proceeds to block 430 and generates a hash or fingerprint associated with the information handling system. The fingerprint may be used to uniquely identify the remote information handling system and/or management controller 410. Information associated with the remote information handling system may be collected such as a MAC address and used to generate the fingerprint. Various algorithms may be used in generating the fingerprint such as cryptographic hash functions, Rabin's algorithm, and machine learning algorithms. The method may then transmit the fingerprint along with other information to mobile device 405 using the secure Bluetooth connection. The other information may include properties associated with management controller 410 such as the MAC address, the port number to be used for the peer-to-peer network communication channel, peer-to-peer network address, etc. The method then proceeds to block 435 where it transmits the fingerprint to mobile device 405 using the Bluetooth connection and sets a timer. The method may transmit other information as aforementioned to mobile device 405.

At block 440, the method at management controller 410 transmits a peer-to-peer network advertisement to mobile device 405. Also, management controller 410 enables the peer-to-peer network interface at the wireless controller. In particular, management controller 410 transmits a Wi-Fi Direct advertisement to mobile device 405 and enables Wi-Fi Direct interface at the wireless controller. By enabling the Wi-Fi Direct interface, mobile device 405 can connect to the Wi-Fi Direct interface on the private port. The method may also set a timer and define a timeout period to receive a peer-to-peer connection from mobile device 405. For example, the method may set the timeout period of five seconds. Management controller 410 should receive a connection to the peer-to-peer wireless network connection at the private port from mobile device 405 within the timeout period. Management controller 410 then waits for the peer-to-peer connection from mobile device 405.

The method at management controller 410 proceeds to decision block 445 where the method determines whether the timeout period is reached. If the timeout period is reached, then the "YES" branch is taken, and the method proceeds to block 510 of FIG. 5. If the timeout period is not reached, then the "NO" branch is taken and the method proceeds to decision block 450 where the method of management controller 410 determines whether it received a connection or access request such as a secure shell session on the private port from mobile device 405, wherein the access request is to access management controller 410. If the connection is received, then the "YES" branch is taken and the method proceeds to block 460 and performs secure shell negotiation. The method also returns or sends the fingerprint to mobile device 405 on the private port after a successful secure shell negotiation. After sending the fingerprint to the mobile device, the method waits for an access request from the mobile device. If the connection is not received then the "NO" branch is taken and the method proceeds to block 455 where the method increments the timer. The method may set the increment value based on the timeout period. For example, the method may set the increment value to half a second, or a second.

At block 465 the method at mobile device 405 receives the transmitted fingerprint and information from management controller 410. A user at mobile device 405 may choose the peer-to-peer wireless network. The method then transmits a request to connect to the peer-to-peer wireless network to management controller 410 through the Bluetooth network connection. The method proceeds to block 470 where the method at mobile device 405 negotiates with management controller 410 for group ownership of the peer-to-peer wireless network connection. The group owner is responsible for maintaining security of the peer-to-peer wireless network connection. In another embodiment, it may be pre-configured for one of mobile device 405 or management controller 410 to be the group owner. In which case, there would be no negotiation. In addition, the method at mobile device 405 sends an access request or connects to management controller 410 by creating a secure shell tunnel with port forwarding on the private port. The method proceeds to block 475.

At block 475, the method compares the received fingerprint and other information such as the MAC address from the peer-to-peer wireless network connection with the fingerprint and the other information such as the MAC address received from the Bluetooth network connection to determine if they matched. The method proceeds to block 505 of FIG. 5 where it is determined whether the compared fingerprint and other information such as the MAC address match. If the fingerprint and the other information such as the MAC address match, then the "YES" branch is taken, and the method proceeds to block 515 of FIG. 5. If the fingerprint and the other information such as the address do not match, then the "NO" branch is taken, and the method proceeds to block 510 of FIG. 5.

At block 510, the peer-to-peer wireless network connection and/or the Bluetooth network connection may be dropped by mobile device 405 and/or management controller 410. Mobile device 405 may notify management controller 410 via the Bluetooth network connection to shut down the Wi-Fi Direct radio located at the remote information handling system. In addition, prior to disconnecting the peer-to-peer wireless network connection, management controller 410 may delete the SSH public key from the key store. Management controller 410 may also detect that the peer-to-peer wireless network connection and/or the Bluetooth network connection has been dropped and disables the peer-to-peer wireless network and/or the Bluetooth network.

Either mobile device 405 or management controller 410 may be the group owner of the peer-to-peer wireless network connection. The group owner may be configured as a gateway keeper with the ability to drop or kill the peer-to-peer wireless network connection or the short-range wireless network connection or both. The group owner may also be configured to drop the peer-to-peer wireless network connection if it detects that the short-range wireless network connection is dropped. No new session will be initiated until the activation switch is activated to indicate that a new session is requested. For example, when a user who is connected using mobile device 405 with management controller 410, but subsequently walks away from a server rack that includes the management controller 410, the wireless controller can automatically detect the time that the connection is idle, and, after a predetermined duration, can shut down the connection and suspend all wireless activity until a new session is requested. Then the method ends.

At block 530, mobile controller 410 compares the secure shell public key received from mobile device 405 at block 470 of FIG. 4 to the secure shell public key received from the Bluetooth network connection at block 420 of FIG. 4. The method proceeds to decision block 535 where the method compares if the secure shell public keys match. If the secure shell public keys match, then the "YES" branch is taken and the method waits proceeds to block 515. If the secure shell public keys do not match, then the "NO" branch is taken and the method proceeds to block 510.

At block 515, identifies the group owner based on the negotiation results for group ownership from block 470 of FIG. 4. The method proceeds to decision block 520 where the method determines whether mobile device 405 is the group owner. If mobile device 405 is the group owner, then the "YES" branch is taken, and the method proceeds to block 525. If mobile device 405 is not the group owner, then the "NO" branch is taken and the method proceeds to decision block 540 where the method determines whether management controller 410 is the group owner. If management controller 410 is the group owner, then the "YES" branch is taken, and the method proceeds to block 545. If management controller 410 is not the group owner, then the "NO" branch is taken, and the method proceeds to block 510. The management controller 410 drops the peer-to-peer network connection for security purposes because neither mobile device 405 nor management controller 410 is the group owner.

At block 525, the method at mobile device 405 blocks any other network connection aside from the current Bluetooth and peer-to-peer wireless network connection, thus restricting the connection to just between mobile device 405 and management controller 410. At block 545, management controller 410, being the group owner, can authenticate and add another information handling system to the group.

At this point, the peer-to-peer wireless network connection is established and mobile device 405 may communicate with management controller 410 via the peer-to-peer wireless network communication channel. The communication channel or frequency is a medium through which the peer-to-peer wireless network connection can send and receive data. The peer-to-peer network communication channel may now be used to transmit network packets such as a set of messages between mobile device 405 and the remote information handling system or management controller 410 in particular. Only one peer-to-peer wireless network connection may be allowed to connect to the management controller 410 of the remote information handling system. Further, the network packets may be encrypted prior to its transmission. A such, mobile device 405 and management controller 410 may communicate packets or data over the peer-to-peer wireless network communication channel, wherein outbound packets are encrypted, and inbound packets are decrypted to securely tunnel the packets between mobile device 405 and management controller 410.

In addition, port forwarding may be enabled so that a port can be specified for a particular network packet. In turn, the network packets are forwarded to the correct port. For example, if the network packets are for port 80, the network packet is directed to that port assuming that the private port is distinct to port 80. After a time period when communication between mobile device 405 and remote information handling system is no longer desired, a request may be made to terminate the Bluetooth network and/or peer-to-peer network tunnel and/or the communication channel. Such a termination request may be made for example, by the user or the application of the mobile device 405. Then, the method ends.

In recapitulation, an information handling system which includes a wireless management controller having a first wireless network interface and a second wireless network interface. The first wireless network interface is used to establish a secure short-range wireless network connection between the wireless management controller and a mobile device. The second wireless network interface will be used to establish a peer-to-peer wireless network connection between the management controller and the mobile device by leveraging the secure short-range wireless network connection. The information handling system leverages the secure short-range wireless network by exchanging identifiable data over the secure short-range wireless network once the secure short-range wireless network connection is established. The identifiable data will be used for mutual authentication between the information handling system and the mobile device. If the mutual authentication is successful, then the mobile device initiates a secure tunnel for data communication with the wireless management controller using the peer-to-peer wireless network connection.

Although the present disclosure includes configuring or establishing a peer-to-peer wireless network connection between a mobile device and an information handling system, the present disclosure may be any one of a variety of applications or other services and/or devices. In one embodiment, the present disclosure includes among others, applications installed in one or more devices that may transmit data between the devices. Examples of these applications and/or services include collaborative applications such as for document creation and/or edits, social network applications such as for exchanging voice/text/graphical data between the devices, data backup applications, messaging applications, file transfer protocol (FTP) applications, etc.

Although FIG. 3, FIG. 4 and FIG. 5 show example blocks of sequence 300 and method 400 in some implementation, sequence 300 and method 400 may include additional steps or blocks, fewer steps or blocks, different steps or blocks, or differently arranged steps or blocks than those depicted in FIG. 3 and FIG. 4 respectively. Additionally, or alternatively, two or more of the blocks of method 400 may be performed in parallel. For example, block 425 and block 430 of method 400 may be performed in parallel.

For the purposes of this disclosure, the terms "wireless transmissions" and "wireless communication" may be used to refer to all types of electromagnetic communications which do not require a wire, cable, or other types of conduits. Examples of wireless transmissions which may be used include, but are not limited to, short-range wireless communication technologies (such as proximity card, radio-frequency identification (RFID), near field communication (NFC), Bluetooth, ISO 14443, ISO 15693, or other suitable standard), personal area networks, peer-to-peer networks (such as Wi-Fi Direct), LANs, WANs, narrowband personal communications services (PCS), broadband PCS, circuit-switched cellular, cellular digital packet (CDPD), radio frequencies, such as the 800 MHz, 900 MHz, 1.9 GHz and 2.4 GHz bands, infra-red and laser.

For the purposes of this disclosure, "short-range wireless communications" refers to any suitable communications transport, protocol, and/or standard allowing two or more suitably configured devices to communicate via wireless transmissions provided that such devices are within approximately one meter of each other. Examples of short-range communications technologies include, without limitation, Bluetooth Class 3, BLE, NFC, RFID, Wi-Fi Direct, proximity card, vicinity card, ISO 14443, and ISO 15693.

As used herein, the term long-range wireless communication is intended to be understood in the context of WLAN and not in the context of regional or global wireless communications, and that the term short-range is intended to be understood in the context of near-field communication and a personal area network.

As used herein, security credentials include information unique to the mobile device that the server or the remote information handling system can use to identify the mobile device and can be verified in order to determine the validity of the mobile device. And vice versa, that is the security credentials include information unique to the server or the information handling system that the mobile device can use to identify the server or the information handling system. An example of security credentials include a username/password combination, a swipe pattern, a pattern recognition, such as a hash or a fingerprint, or an iris scan, or another type of security credential that operates to validate the identity of the mobile device or the information handling system to be authorized to utilize the management application associated with the management controller of the information handling system.

In accordance with various embodiments of the present disclosure, the methods described herein may be implemented by processing logic that includes hardware, software, or a combination of both by an information handling system. Further, in an exemplary, non-limited embodiment, implementations can include distributed processing, component/object distributed processing, and parallel processing. Alternatively, virtual information handling system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for a host to provide a seamless and secure access to a management and monitoring system to a mobile device, the method comprising:
   subsequent to establishment of a secure short-range wireless network connection with the mobile device, establishing a peer-to-peer wireless network connection including:
      receiving and storing, by the host, a secure shell public key from the mobile device;
      generating a host fingerprint and randomly identifying a port number for the peer-to-peer wireless network connection;
      transmitting a media access control address, the port number, and the host fingerprint to the mobile device through the secure short-range wireless network connection;
      disabling network traffic through other ports associated with the peer-to-peer wireless network connection;
      receiving an access request from the mobile device on the port number of the peer-to-peer wireless network connection subsequent to the mobile device authenticating the media access control address and the host fingerprint;
      determining whether the mobile device is authentic through a secure shell negotiation based on the secure shell public key; and
      in response to the determining that the mobile device is authentic, identifying a group owner of the peer-to-peer wireless network connection based on a negotiation with the mobile device; and
   subsequent to the establishing the peer-to-peer wireless network connection, communicating packets with the mobile device on the port number of the peer-to-peer wireless network connection, wherein outbound packets are encrypted and inbound packets are decrypted to securely tunnel the packets.

2. The method of claim 1, further comprising in response to the determining that the mobile device is not authentic, disabling the peer-to-peer wireless network connection.

3. The method of claim 1, further comprising receiving a peer-to-peer wireless network connection request from the mobile device on the port number through a secure shell tunnel.

4. The method of claim 1, wherein the disabling the network traffic through the other ports includes generating firewall rules.

5. The method of claim 1, wherein the peer-to-peer wireless network connection is a secure Wi-Fi Direct network connection.

6. The method of claim 1, further comprising transmitting security credentials to the mobile device via the secure short-range wireless network connection.

7. The method of claim 1, further comprising disabling password authentication with the mobile device.

8. The method of claim 1, further comprising enabling certificate based authentication with the mobile device.

9. An information handling system, comprising:
a wireless management controller including a first wireless network interface and a second wireless network interface, wherein the first wireless network interface is used to establish a secure short-range wireless network connection between a management controller and a mobile device, and wherein the second wireless network interface is used to establish a peer-to-peer wireless network connection between the management controller and the mobile device;
the management controller configured to establish the peer-to-peer wireless network connection which includes to:
authenticate the mobile device through secure shell negotiation;
subsequent to the authentication of the mobile device, the management controller is further configured to:
randomly identify a port number for the peer-to-peer wireless network connection; and
disable network traffic through other ports associated with the peer-to-peer wireless network connection;
transmit a media access control address, the port number, and a host fingerprint to the mobile device through the secure short-range wireless network connection;
receive access request from the mobile device on the port number of the peer-to-peer wireless network connection after the mobile device authenticated the media access control address and the host fingerprint; and
subsequent to the establishment of the peer-to-peer wireless network connection, to communicate packets with the mobile device on the port number of the peer-to-peer wireless network connection, wherein outbound packets are encrypted and inbound packets are decrypted to securely tunnel the packets.

10. The information handling system of claim 9, wherein the management controller is further configured to receive the access request via a secure shell session.

11. The information handling system of claim 9, wherein the management controller is further configured to disable the second wireless network interface if the access request is not received from the mobile device within a timeout period.

12. The information handling system of claim 9, wherein the management controller is further configured to detect that the peer-to-peer wireless network connection is lost subsequent to the mobile device dropping the peer-to-peer wireless network connection.

13. The information handling system of claim 9, wherein the management controller is further configured to shut down a Wi-Fi Direct radio of the wireless management controller subsequent to a receipt of a notification from the mobile device via the secure short-range wireless network connection to shut down the Wi-Fi Direct radio.

14. A non-transitory computer readable medium storing instructions that when executed cause a processor to:
authenticate a mobile device by verifying a secure shell public key received from the mobile device through a first wireless network connection;
subsequent to the authentication of the mobile device, establish a second wireless network connection with the mobile device that further causes the processor to:
transmit a generated host fingerprint with a media access control address and a randomly identified port to the mobile device through the first wireless network connection;
disable network traffic through ports other than the randomly identified port; and
receive an access request from the mobile device on the randomly identified port of the second wireless network connection; and
subsequent to the establishment the second wireless network connection, to communicate packets to the mobile device on the randomly identified port of the second wireless network connection, wherein outbound packets are encrypted and inbound packets are decrypted to securely tunnel the packets.

15. The non-transitory computer readable medium of claim 14, further storing instructions, that when executed by the processor, cause the processor to add the secure shell public key to a list of authorized public keys.

16. The non-transitory computer readable medium of claim 14, wherein the access request is received via a secure shell session.

17. The non-transitory computer readable medium of claim 14, further storing instructions, that when executed by the processor, cause the processor to drop the second wireless network connection if the processor fails to receive the access request from the mobile device within a timeout period.

18. The non-transitory computer readable medium of claim 14, further storing instructions, that when executed by the processor cause the processor to send the generated host fingerprint to the mobile device via the second wireless network connection.

19. The non-transitory computer readable medium of claim 14, further storing instructions, that when executed by the processor, cause the processor to drop the second wireless network connection upon detection that the second wireless network connection is lost.

20. The non-transitory computer readable medium of claim 14, further storing instructions, that when executed by the processor cause the processor to drop the second wireless network connection upon detection that the mobile device added another device to the second wireless network connection.

* * * * *